E. MORSE.
Hand-Seeder.
No. 12,554.
Patented Mar 20, 1855.
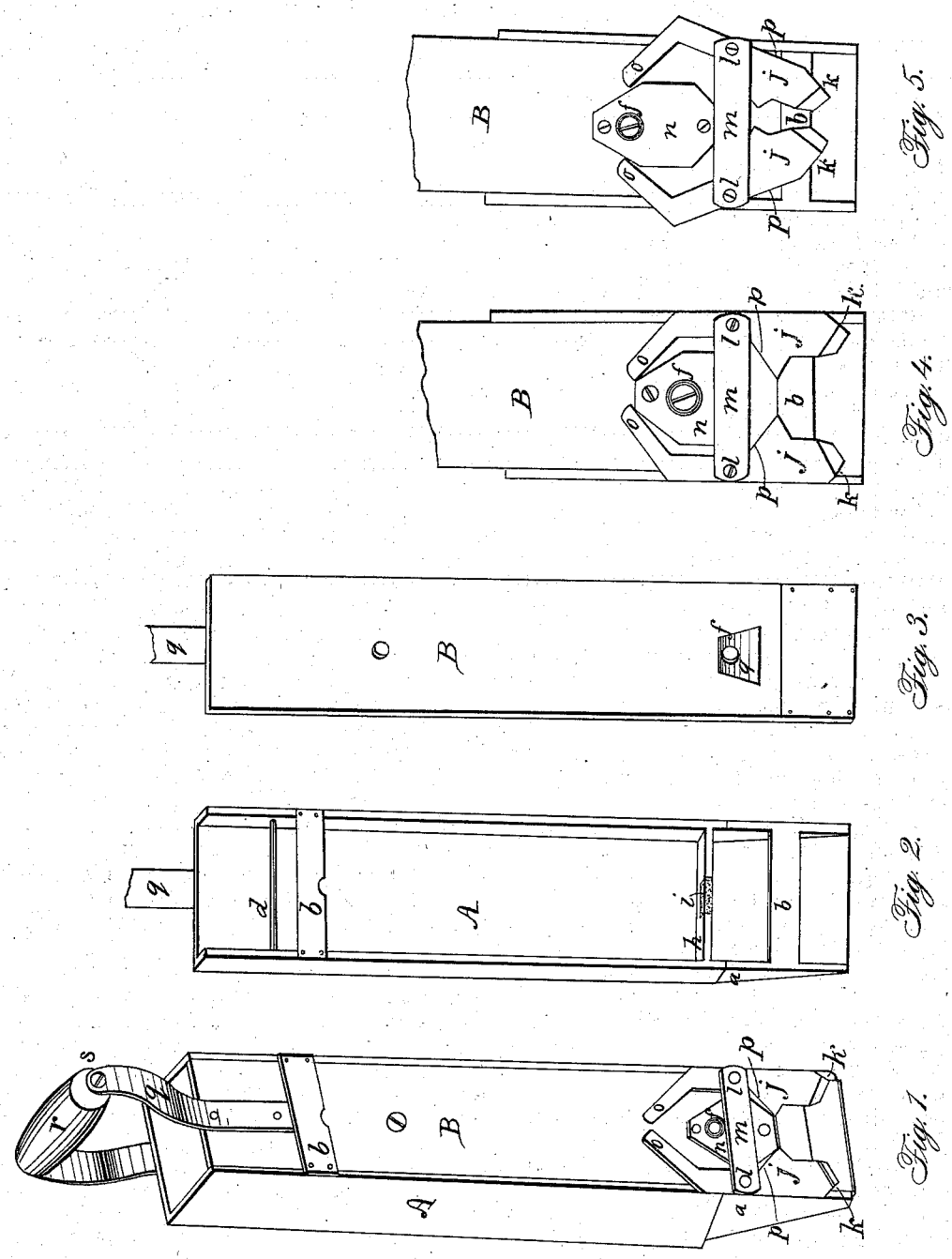

UNITED STATES PATENT OFFICE.

EBENEZER MORSE, OF WALPOLE, NEW HAMPSHIRE.

IMPROVEMENT IN SEED-PLANTERS.

Specification forming part of Letters Patent No. 12,554, dated March 20, 1855.

*To all whom it may concern:*

Be it known that I, EBENEZER MORSE, of Walpole, in the county of Cheshire and State of New Hampshire, have invented a new and useful Mode of Constructing Seed-Planters; and I do hereby declare that the following is a full and exact description thereof, reference being had to the annexed drawings, in which like letters refer to like parts in all the figures.

The nature of my invention consists in combining with a tubular seed-box two vibrating scrapers and a sliding back board, with a seeding-recess and a cam to act upon the scrapers, so that by raising and depressing the handle at the upper end of the box the seed will be received in the seeding-recess and conveyed to the depositing-tube while the seed previously in the tube is being dropped, covered with earth by the scrapers, and stamped upon with the end of the back board.

Figure I is a perspective view of the planter. Fig. II is a perspective view of the tubular box, with its back board removed to show its bottom and its brush, past which the seeding-recess moves with its quota of seed. Fig. III is the sliding back board reversed to show its seeding-recess and regulating-screw.

A, Fig. I, is a tubular box, made wedge shape at its lower end, with a cap or metallic covering, $a$. $b\ b$ are two cross-pieces or girts, made fast to and hold the sides of the box in their places, and beneath which, and upon the rod $d$ and the edge of the bottom $h$ of the box, the back board, B, slides. (See rod and bottom of box, Fig. II.) In this back board there is a screw, $f$, passing through it into the seeding-recess $g$. (See Fig. III.) In the edge of the bottom $h$ of the box there is a brush, $i$, made fast to keep back the superabundant seed when the machine is in operation. (See Fig. II.)

$j\ j$ are two metallic scrapers, with their lower ends bent up at an angle of thirty to forty degrees. (See $k\ k$, Figs. I and V.) These scrapers are confined to the box with the screws $l\ l$ through the cross-girt $m$, and passing into the edge of the box.

$n$ is a cam made fast to the back board to act upon the arms $o\ o$ and the shoulders P P of the scrapers as the back board is raised and depressed.

$q\ q$ are two straps of metal made fast, one to the front and the other to the back of the box, and holding between them at their upper ends the handle $r$ by means of the screws $s$.

Operation: Put a quantity of seed in at the top of the box. Take hold of the handle $r$, with the back of the hand toward the back board, B. Then raise and depress the back board by raising and depressing the back part of the hand, by which means the seed will be received into the seeding-recess and passed beneath the bottom of the box into the depositing-tube. Now, it will be seen that if the end of the depositing-tube $a$ is plunged into the earth with the seed therein contained and the back board raised, in its progress upward the cam $n$ will not have acted upon the arms $o$ of the scrapers $j$ until the end of the depositing-tube has opened, as seen at Fig. IV, and dropped its seed; and it will also be seen that as the back board is further raised the cam will act upon the arms of the scrapers, causing their projecting oblique lower ends, $k$, to approach each other, as seen at Fig. V, and cover the seed with earth, and that by depressing the back board the earth will be stamped upon the seed and the seeding-tube supplied with seed for the next hill.

What I claim, and desire to secure by Letters Patent, is—

1. The scrapers $j\ j$, the cam $n$, and sliding back board, B, as arranged, combined, and operating conjointly with the seed-box A, for the purpose of depositing seed in hills, covering it with earth, and pressing the earth upon the seed, substantially in the manner above described.

2. The oscillating motion of the horizontal handle, connected to the front and back part of the seed-box by a hinge-joint at each end of the handle.

EBENR. MORSE.

Witnesses:
HENRY MELLISH,
JAMES WM. MELLISH.